(12) United States Patent
Latka et al.

(10) Patent No.: US 8,481,101 B2
(45) Date of Patent: Jul. 9, 2013

(54) MATE BEVERAGE

(75) Inventors: Gerhard Latka, Parry Sound (CA); John Warner, Rousseau (CA)

(73) Assignee: Sol Mate AG, Grandy Duchy of Luxembourg (LU)

( * ) Notice: Subject to any disclaimer, the term of this patent is extended or adjusted under 35 U.S.C. 154(b) by 1082 days.

(21) Appl. No.: 12/300,266

(22) PCT Filed: May 11, 2007

(86) PCT No.: PCT/CA2007/000811
§ 371 (c)(1),
(2), (4) Date: Apr. 8, 2009

(87) PCT Pub. No.: WO2007/131333
PCT Pub. Date: Nov. 22, 2007

(65) Prior Publication Data
US 2009/0246347 A1    Oct. 1, 2009

Related U.S. Application Data

(60) Provisional application No. 60/799,333, filed on May 11, 2006.

(51) Int. Cl.
*A23F 3/34*   (2006.01)
*A23F 5/16*   (2006.01)
*A23F 5/44*   (2006.01)
*A23L 2/40*   (2006.01)
*A61K 35/78*  (2006.01)

(52) U.S. Cl.
CPC ......................................... *A23F 3/34* (2013.01)
USPC ............ 426/590; 426/655; 426/384; 424/727

(58) Field of Classification Search
CPC ............................................................ A23F 3/34
USPC .................................................. 426/427, 590
See application file for complete search history.

(56) References Cited

U.S. PATENT DOCUMENTS

| | | | |
|---|---|---|---|
| 453,356 A * | 6/1891 | Piccolo | 172/610 |
| 3,783,632 A * | 1/1974 | Reimus et al. | 62/123 |
| 3,903,316 A * | 9/1975 | Hoover | 426/423 |
| 5,427,806 A | 6/1995 | Ekanayake et al. | |
| H1628 H | 1/1997 | Ekanayake et al. | |
| 5,780,086 A | 7/1998 | Kirksey et al. | |
| 5,977,120 A | 11/1999 | Giles, Jr. | |
| 6,025,363 A | 2/2000 | Giles, Jr. | |
| 6,277,396 B1 | 8/2001 | Dente | |
| 6,413,558 B1 | 7/2002 | Weber et al. | |
| 6,616,955 B2 | 9/2003 | Nunes et al. | |
| 6,703,056 B2 | 3/2004 | Mehansho et al. | |
| 6,936,283 B2 | 8/2005 | Langeland | |
| 2002/0132780 A1 | 9/2002 | Heisey et al. | |
| 2003/0069202 A1 | 4/2003 | Kern et al. | |
| 2004/0076690 A1 | 4/2004 | Ikemoto et al. | |
| 2004/0096547 A1 | 5/2004 | Ferruzzi | |
| 2004/0198754 A1 | 10/2004 | McKee et al. | |
| 2005/0037025 A1 | 2/2005 | Gow et al. | |
| 2005/0089584 A1 | 4/2005 | Gow et al. | |
| 2005/0089591 A1 | 4/2005 | Gow et al. | |
| 2005/0118293 A1 | 6/2005 | Gow et al. | |
| 2005/0130933 A1 | 6/2005 | Jacobs et al. | |
| 2005/0186314 A1 * | 8/2005 | Sasame et al. | 426/435 |
| 2005/0281896 A1 | 12/2005 | Gardiner et al. | |

FOREIGN PATENT DOCUMENTS

| | | |
|---|---|---|
| DE | 1106154 | 11/1961 |
| JP | 06 135848 | 5/1994 |
| WO | WO 03/003844 | * 1/2003 |

OTHER PUBLICATIONS

Gelatin Processing: National Organic Standards Board Technical Advisory Panel Review, Mar. 1, 2002. Available online at: http://www.ams.usda.gov/nop/NationalList/TAPReviews/Gelatin.pdf
"The Essence of Nearly Anything, Drop by Limpid Drop", Harold McGee, Sep. 5, 2007, The New York Times. Available online at: http://select.nytimes.com/gst/abstract.html?res=F70D16F63E5D0C768CDDA00894DF404482.

* cited by examiner

*Primary Examiner* — D. Lawrence Tarazano
*Assistant Examiner* — Philip Dubois
(74) *Attorney, Agent, or Firm* — Bereskin & Parr LLP/S.E.R.C.R.L., s.r.l.; Micheline Gravelle

(57) ABSTRACT

A process for preparing a maté extract, a maté beverage base formulation and a maté beverage are disclosed. The maté extract is rich in natural caffeine, theobromine, theophylline and antioxidant compounds without the addition of preservatives and synthetic materials and is used to make a maté beverage base formulation. The maté beverage base formulation may be used to make maté beverages, such as carbonated maté beverages.

20 Claims, No Drawings

MATE BEVERAGE

FIELD OF THE INVENTION

The present invention relates to a process for preparing a maté extract comprising caffeine, theobromine, theophylline and antioxidant compounds. The maté extract can be used as an ingredient in the preparation of a maté syrup or maté beverage base formulation for making maté beverages, such as carbonated maté beverages.

BACKGROUND OF THE INVENTION

Beverages, such as teas, containing caffeine are consumed throughout the world. The extraction of tea material is known in the art. For example, U.S. Pat. No. 5,427,806 discloses a process for the production of green tea extracts using a gelatin solution to remove oxidized or polymerized flavanols. However, this process uses an acidified aqueous solution containing preservatives to obtain the green tea extract from the green tea materials. A later patent by the same group, U.S. Pat. No. 5,780,086 discloses color and shelf stable beverage compositions containing tea extracts including a beverage syrup for use in juices, carbonated and non-carbonated beverages. However, the tea product claimed contains green tea extracts obtained by contacting the green tea materials with an acidified solution containing preservatives, which is subsequently gelatin treated, clarified and concentrated. In addition, this patent also contemplates the addition of synthetic compounds, such as caffeine, to the beverage compositions. A tea extract and process is also disclosed in United States statutory invention registration number H1,628. The process there describes extraction of tea materials with water, mixing the extract containing solution with protein, acidifying the protein containing extract and separating the precipitate. One of the preferred proteins listed is gelatin of any particle size derived from animal protein. Furthermore, compositions including the use of synthetic compounds such as caffeine are described. A recently published US patent application 20050186314, discloses the use of silica or silica-containing compounds to remove proteins and polysaccharides from green tea extracts in beverages that are sold hot. The application describes extraction of green tea leaves with hot water prior to silica treatment and contemplates the addition of acid after the extraction procedure.

Recent US patent applications have been published describing the use of hex species in formulations, as either the main component or part of the formulation, for human therapeutic purposes. The genus *Ilex* is found worldwide in subtropical and tropical regions. *I. paraguariensis* is known as maté and is the most commercialized plant of South America. US patent applications 20050118293 and 20050089591 describe compositions derived from *Ilex* species, particularly *Ilex paraguariensis*, having lowered caffeine and tannin concentrations, as oral delivery formulations for use in the treatment of human physiological and medical conditions. However, the application claims an extraction process from native maté plant material using supercritical carbon dioxide solutions under pressure. The application also describes mate compositions having predetermined characteristics, such as a lowered amount of caffeine, elevated amounts of caffeoyls, and/or lowered amounts of tannin compounds compared to the native maté plant materials. However, the specification notes that some of the chemical constituents found in maté, such as caffeine, theobromine and theophylline may be purchased from a chemical supply company. In US patent application 20050089584, a method and composition for oral delivery of Areca and maté or theobromine for use in the treatment of mental and physical conditions is disclosed. In US patent application 20050037025, a method and compositions comprising kava and maté or theobromine for the treatment of conditions related to mental and physical fatigue is claimed. Extraction methods disclosed in both these applications include steam distillation, liquid extraction (using dicholoromethane or petroleum ether), hydroalcoholic extraction, Soxhlet extraction and supercritical carbon dioxide solution under pressure. The specification from both of these patent applications also notes that theobromine may be obtained from maté, other sources or made by synthetic means known to those skilled in the art.

Prior efforts to make a maté syrup for use in maté beverages are disclosed in German patent number 1106154 issued in 1959. The German patented process employs an aqueous extraction of maté leaf using boiling water under pressure. The tea brew extract is then treated with preservatives such as sodium benzoate (0.08%) and a high concentration of citric acid (6.5%). The extract is then stored for 14 days, treated with a silica compound and filtered through an asbestos filter. However, the product from the patented German process is not certified organic, relies on a high degree of acidity and on the addition of chemical preservatives to achieve a functional shelf-life. In addition, caffeine levels in the German product are achieved through the addition of synthetic caffeine, rather than utilizing caffeine derived solely from the maté plant.

Therefore there is a need in the art for a process of preparing a maté extract rich in natural caffeine, theobromine, theophylline and antioxidant compounds completely derived from maté plant materials, without the addition of preservatives and synthetic materials/compounds for use in the preparation of a preservative-free maté beverage base formulation.

SUMMARY OF THE INVENTION

The present application relates to a specialized and unique formulation and production procedure for a preservative-free liquid maté extract rich in natural caffeine, theobromine, theophylline and antioxidant compounds.

The application provides a process for preparing a clarified mate extract comprising the steps of:
(a) providing plant material from a plant of the species *Ilex*;
(b) producing a raw extract from the plant material which comprises caffeine, theobromine and theophylline;
(c) adding gelatin to the raw extract;
(d) adding silica to the gelatin-treated solution of step (c) and allowing the mixture to settle;
(e) freezing the silica, gelatin containing extract of step (d); and
(f) thawing the extract of step (e) and separating the clarified liquid supernatant from the solids to obtain a clarified maté extract and an extract cake.

A significant quantity of natural maté caffeine remains bound in the extract cake of step (f). In one aspect, the extract cake of step (f) is subjected to an additional step where the extract cake is washed with an aqueous phase, preferably cold water in a preferred embodiment. In this additional step, the aqueous solution added to the extract cake is separated from the solids to obtain a maté cake wash.

The clarified maté extract can be used as an ingredient for preparation of a maté syrup or maté beverage base formulation for use in maté beverages including carbonated maté beverages. The final product is advantageous in that it complies with organic certification regulations and delivers caffeine and other phyto-stimulants without the addition of synthetic materials or preservatives.

In one embodiment, the invention provides a maté beverage base formulation comprising the following ingredients:
(a) clarified maté extract;
(b) water;
(c) sugar;
(d) colour; and
(e) acid.

In a specific embodiment, the water component of the maté beverage base formulation is the maté cake wash.

In another embodiment, the invention provides a process for preparing the maté beverage base formulation comprising the steps of:
(a) providing a clarified maté extract;
(b) adding water to the extract;
(c) agitating and heating the mixture of steps (a) and (b) until all ingredients are in solution; and
(d) adding sugar, acid and colour.

In another embodiment, the preparation of a maté beverage base formulation may be accomplished using the maté cake wash as the water component.

In another embodiment, the invention provides for maté beverages, including carbonated maté beverages, prepared using the maté beverage base formulation of the invention.

Other features and advantages of the present invention will become apparent from the following detailed description. It should be understood, however, that the detailed description and the specific examples while indicating preferred embodiments of the invention are given by way of illustration only, since various changes and modifications within the spirit and scope of the invention will become apparent to those skilled in the art from this detailed description.

DETAILED DESCRIPTION OF THE INVENTION

As noted previously, the present invention relates to a clarified maté extract that can be used for the preparation of a maté syrup or maté beverage base formulation. Accordingly, the present invention provides:
(a) providing plant material from a plant of the species *Ilex*;
(b) producing a raw extract from the plant material which comprises caffeine, theobromine and theophylline;
(c) adding gelatin to the raw extract;
(d) adding silica to the gelatin-treated solution of step (c) and allowing the mixture to settle;
(e) freezing the silica, gelatin containing extract of step (d); and
(f) thawing the extract of step (e) and separating the clarified liquid supernatant from the solids to obtain a clarified maté extract and an extract cake.

As noted above, a significant quantity of natural maté caffeine remains bound in the extract cake of step (f). In one aspect, the extract cake of step (f) is subjected to an additional step where the extract cake is washed with an aqueous phase, preferably cold water in a preferred embodiment. In this additional step, the aqueous solution added to the extract cake is separated from the solids to obtain a maté cake wash.

Plant Material

The plant material is obtained from a plant of the *Ilex* species. Preferably, the plant material is obtained from *Ilex paraguariensis*. The leaves and stems of the plant are toasted, preferably in wood-fueled toasting ovens at 88° C. to 92° C., preferably at 90° C. for 13 to 17 minutes, preferably for 15 minutes. Toasted plant materials are milled with a hammer mill to a particle size of about 2 to 10 mm, preferably to a particle size of 3 mm to 5 mm. Toasted materials are sifted to separate leaf and stem materials. Separated plant parts are re-combined to obtain a mixture of about 93% to 97% leaf and 3% to 7% stem w/w, preferably 95% leaf and 5% stem w/w.

Green Maté Extract Concentrate

The green maté extract concentrate may be produced from green maté leaves. Leaf material may be extracted with hot water at about 90° C. to 100° C., preferably 100° C., under agitation at 40 to 60 rpm, preferably 60 rpm. The resulting liquid is concentrated under vacuum and contains a minimum of 8% to 10% caffeine, preferably 10% caffeine, 0.7% to 1.0% theobromine, preferably 1.0% theobromine, and 0% to 0.2% theophylline, preferably 0.2% theophylline, derived from the maté plant.

In one aspect, the toasted organic maté leaf material and green maté extract concentrate is the plant material of step (a).

Extraction

The extraction process of step (b) is carried out using an extraction vessel, holding tanks, transfer pipes and related equipment constructed of food-grade stainless steel. A person skilled in the art would readily be able to select appropriate extraction vessels. In a particular aspect, the extraction of step (b) is carried out using an extraction vessel that is totally enclosed with a top loading port and a screened bottom discharge valve to facilitate drainage of the finished extract. In another particular aspect, the aqueous mate extraction of step (b) is carried out in a double-jacketed kettle.

In the maté extraction step, the extraction vessel is at 2.1 $kg/cm^2$ and is filled with the required amount of water heated to 90° C. to 100° C., preferably heated to 100° C. In one aspect, a circular agitator is employed to facilitate optimal contact of the maté plant material with the extraction solvent. Once the extraction vessel is filled with water, heated to the desired temperature, and the agitator is running, the *Ilex* plant material is added. In one aspect, the *Ilex* plant material added is the toasted organic maté leaf material, followed by the green maté extract concentrate. In another aspect, the *Ilex* plant material is the green maté extract concentrate, followed by the toasted organic maté leaf material. The extraction mix of step (b) is maintained at the desired temperature under agitation ("thermal extraction interval"). In one aspect, the extraction mix of step (b) is agitated for 8 to 12 minutes. In another aspect, the extraction mix of step (b) is agitated for 10 minutes. In one aspect, the extraction mix of step (b) is agitated at a speed of 40 to 60 rpm. In another aspect, the extraction mix of step (b) is agitated at a speed of 60 rpm. In a particular aspect, the extraction mix of step (b) is maintained at 100° C., and agitated at 60 rpm for 10 minutes.

Once the required thermal extraction interval is achieved for extraction, the agitator is stopped. The liquid fraction ("hydro-thermal extract") is drained, cooled, and strained into a sterilized holding tank. In one aspect, the holding tank is stainless steel. In one aspect, the hydro-thermal extract is cooled using a heat exchanger immediately following the end of the thermal extraction interval. In another aspect, the hydro-thermal extract is cooled from the extraction temperature in step (b) to 5° C. to 10° C. In a particular aspect, the hydro-thermal extract is cooled to 5° C. In one aspect, the hydro-thermal extract is strained through a screen into the sterilized stainless steel holding tank. In a particular aspect, the hydro-thermal extract is strained through a 250 μm screen into a sterilized stainless steel holding tank.

Immediately following completion of the hydro-thermal extraction phase, the remaining maté solid materials ("maté mash") are transferred from the extraction vessel and pressed. Pressing of the maté mash should be completed quickly in order to maintain a minimum maté mash temperature of 30° C. to 50° C. which facilitates full release of essential oils and other flavour-rich compounds. In a particular aspect, a minimum maté mash temperature of 30° C. is maintained during pressing. The maté mash is pressed under a selected peak pressure for a period of 5 to 10 minutes, preferably 10 minutes, or until the flow of liquid stops.

In one aspect, the maté mash is pressed using a rack and cloth pack press. In another aspect, the press must be capable of achieving and maintaining a peak pressure. In a particular aspect, the press must be capable of achieving and maintaining a peak pressure of 250 kg/cm². A person skilled in the art would readily be able to select an appropriate press. Accessories required for pressure extraction using the rack and cloth pack press include High Density Polyethylene (HDPE) frame separators, HDPE press frames, and synthetic press cloth with an opening size of 0.5 to 1.5 mm, preferably with an opening size of 1 mm. A person skilled in the art would readily be able to select other appropriate food-safe frame separators and press frames.

The liquid is collected and strained through a screen. In one aspect, the collected liquid is strained through a 250 µm screen. The strained liquid is then combined with the hydrothermal extract in the sterilized stainless steel holding tank prior to the clarification step.

Clarification

The raw maté extract from step (b) is clarified using a synergistic two-part colloidal clarification process. In the first step, the raw maté extract is treated with gelatin and silica to initiate floc formation. In the second step, a secondary floc formation and sedimentation reaction is catalyzed through a post-seeding freeze treatment ("cryoflocculation"). The inventors have demonstrated that gelatin and silica treatments must be used in combination and in addition to the subsequent freeze treatment step, in order to achieve improved clarification. The inventors have shown that only gelatin-silica treatments or only freeze treatment alone do not achieve desired clarification as when both steps are applied together and in sequential order.

Briefly, clarification is commenced by first contacting the raw maté extract with a gelatin solution (step (c)), allowing the solution to mix, subsequently adding a silica suspension (step (d)), and further allowing the solution to mix. Prior to cryoflocculation (step (e)), the seeded mixture is chilled and allowed to settle in a tank without any disturbance to allow for sedimentation of solids. After this period, the supernatant liquid is drawn off and frozen to initiate the cryoflocculation reaction.

The gelatin treatment is applied to the raw maté extract at 0.10% w/w to 0.15% w/w of the total extract formula, preferably at 0.15% w/w of the total extract formula. The prepared silica suspension is then added immediately following the gelatin treatment. Silica treatment is applied at 0.10% w/w to 0.15% w/w of the total extract formula, preferably at 0.15% w/w of the total extract formula.

The specific combination of gelatin, followed by silica results in synergistic clarification of the raw maté extract. This is due to the fact that the gelatin applied is specially formulated to act in combination with a matched silica gel suspension; this specific interaction results in the initiation of floc seeding or floc formation.

Once the gelatin solution and silica suspension have been added and blended, the floc seeded raw maté extract is chilled to 3° C. to 6° C., preferably chilled to 5C and allowed to settle in a tank without any physical disturbance for a period of 44 to 48 hours, preferably for 48 hours.

Following the chill period, the supernatant liquid is drawn off from the sedimented solids and is chilled to −15° C. to −20° C., preferably to −18° C. for at least 20 hours, preferably for at least 24 hours, or until extract is solidly frozen through-out. Once full extract solidification is achieved, the frozen extract is allowed to thaw with no physical disturbance (step (f)). Once the frozen extract is fully thawed, the clarified supernatant liquid is separated from the sediment and is strained. In one aspect, the clarified supernatant liquid is siphoned. In another aspect, the siphoned clarified supernatant is strained through a 200 µM to 250 µm screen. In a particular aspect, the siphoned supernatant is strained through a screen that is 250 µm. The siphoned and strained supernatant is the clarified maté extract. The remaining sediment is the "extract cake".

A significant quantity of natural maté caffeine remains bound in the extract cake of step (f). In one aspect, the extract cake of step (f) is subjected to an additional step where the extract cake is washed with an aqueous phase, preferably cold water in a preferred embodiment. In this additional step, the aqueous solution added to the extract cake is separated from the solids to obtain a maté cake wash. The maté cake wash contains re-captured caffeine and other bound xanthines, such as theobromine and theophylline. One part extract cake is combined with 5.5 parts cold potable water at 15° C. to 20° C., preferably at 20° C., in a vessel. In one aspect, the vessel is stainless steel. This mixture is then agitated for 8 to 12 minutes, preferably for 10 minutes, at a speed of 40 rpm to 60 rpm, preferably at 60 rpm. Following this step, the mixture is filtered. A person skilled in the art would readily be able to select appropriate filter aids. The filtered product is the maté cake wash. In one aspect, the maté cake wash is used as the water component in the preparation of a maté beverage base formulation.

Process for Preparation of Maté Beverage Base Formulation

The clarified maté extract can be used for the preparation for the maté syrup or maté beverage base formulation. In one embodiment, the invention provides a maté beverage base formulation comprising the following ingredients:

(a) clarified maté extract;
(b) water;
(c) sugar;
(d) colour; and
(e) acid.

In a preferred embodiment, the clarified maté extract is combined with water and is heated under agitation to a temperature of 60° C. to 70° C., preferably to 70° C. In another preferred embodiment, the maté cake wash is used as the water component that is combined with the clarified maté extract. The sugar, acid and colour are added and mixed until all ingredients are completely in solution. The acid is added to adjust the final acidity of the solution. In one aspect, the sugar added is NOP organic cane. In another aspect, the colour added is organic aromatic caramel colour. Acids that may be added to the solution include acetic acid, tartaric acid, malic acid, fumaric acid, lactic acid, phosphoric acid and citric acid. Preferably, the acid added is phosphoric acid or citric acid. Most preferably, the acid added is citric acid. Phosphoric acid may be added in the range of 0.9%-4.5%. Citric acid may be added in the range of 1%-2%. In a preferred embodiment, the prepared maté beverage base formulation contains 10%-30% clarified maté extract, preferably 18%-22% clarified maté extract, 50%-65% NOP organic cane sugar, preferably 56%-60% NOP organic cane sugar, 1%-10% organic caramel colour, preferably 2%-5% organic caramel colour, 10%-25% water, preferably 15%-18% water and 1%-2% citric acid, preferably 1.2%-1.4% citric acid. In a specific embodiment, the prepared maté beverage base formulation contains 20.03% clarified maté extract, 58.4% NOP organic cane sugar, 3.56% organic caramel colour, 16.76% water and 1.25% citric acid (to achieve a final acidity of 1.4 g/10 g w/w measured as citric acid). The beverage may also contain other suitable ingredients including organic lime juice and/or organic lemon oil. Once ingredients are mixed, the degrees brix is verified and the finished maté syrup or maté beverage base formulation is filled in suitable containers. In one aspect, the degrees brix is 65. In another aspect, plastic lined drums, or plastic pails are suitable containers. In another aspect, aseptic packing in sterile bag-in box containers are suitable containers. The final beverage preferably comprises about 0.15 to about 0.30 mg/mL of caffeine, more preferably about 0.18 to about 0.22 mg/mL. In a 300 mL serving, there will preferably be about 55 to 65 mg of caffeine.

The maté syrup or maté beverage base formulation may be stored at 5° C. if used within 7 days, otherwise the maté syrup or maté beverage base formulation is stored frozen.

Maté Beverages Prepared Using Maté Beverage Base Formulation

The maté syrup or maté beverage base formulation is used to produce a maté beverage, such as a ready-to-drink, sparkling Yerba Maté beverage. In one aspect, a carbonated maté beverage is prepared by combining the maté beverage base formulation with water in a holding tank. Preferably, the maté beverage is 65 degrees brix and the water is filtered. The holding tank is preferably a sterile stainless steel tank. The mixture is agitated to a uniform mix (single strength beverage mix). Degrees brix and acid parameters of the mixture are measured and adjusted if required. The single strength mixture is then filtered into a sterile stainless steel holding tank. A person skilled in the art would readily be able to select appropriate filter aids. The filtered mixture is carbonated with food-grade carbon dioxide and the maté beverage is filled into retail packaging. In a preferred aspect, the filtered mixture is carbonated to a level of 3.0 volumes with food-grade carbon dioxide. In another preferred aspect, glass bottles are used as retail packaging. In a preferred embodiment, the prepared sparkling yerba maté beverage contains 5%-20% maté beverage base formulation, preferably 10%-12% maté beverage base formulation and 80%-95% carbonated water, preferably 86%-90% carbonated water. In a specific embodiment, the prepared sparkling yerba maté beverage contains 11.23% maté beverage base formulation and 88.77% carbonated water.

The following non-limiting examples are illustrative of the present invention:

EXAMPLES

Example 1

1.0 Summary

This Example outlines a specialized and unique formulation and production procedure for a certified organic, preservative-free liquid maté extract rich in natural caffeine, theobromine and antioxidant compounds. The procedure entails an aqueous extraction of a combination of toasted maté (*Ilex paraguariensis*) leaves and a maté leaf extract concentrate. Water extraction is followed by extract clarification using synergistic colloidal clarification and cryoflocculation methods. The final clarified extract is then used as an ingredient for preparation of a 65 degrees brix maté syrup for use in carbonated maté beverages. The final product is unique in that it complies with organic certification regulations and delivers caffeine and other phyto-stimulants without the addition of synthetic materials.

2.0 Extraction
2.1 Raw Materials
2.1.1 Toasted Organic Maté Leaf

The plant material required for extract production consists of a mixture of toasted leaves and stems of certified organic, NOP (USDA National Organic Program, 7 CFR Part 205) compliant *Ilex paraguariensis* Saint-Hillaire, commonly known as Yerba Maté or Paraguay Tea. Leaf and stem materials are toasted in wood-fueled toasting ovens at 90° C. for 15 minutes. Toasted plant materials are milled with a hammer mill to a particle size of 3 mm to 5 mm. Toasted materials are sifted to separate leaf and stem materials. Separated plant parts are re-combined to obtain a mixture of 95% leaf and 5% stem w/w. Finished plant material must be packed and stored at maximum 18% moisture to avoid microbial proliferation.

2.1.2 Green Maté Extract Concentrate

The maté extract concentrate required for the maté preparation consists of a certified organic extract of the green leaves of certified organic, NOP compliant *Ilex paraguariensis* Saint Hillaire plant material. The green maté leaf material is extracted with hot water at 100° C., under agitation at 60 rpm. The resulting liquid is concentrated under vacuum and must contain a minimum of 8.0% caffeine and 0.7% theobromine derived from the maté plant.

2.1.3 Water

Potable water is used as the extraction solvent and must conform to Canadian Drinking Water Standards and the following water quality characteristics:

| | |
|---|---|
| pH: | 6.8-7.8 |
| Hardness: | <50 mg/L |
| *E. coli*: | 0 cfu/100 mL |
| Coliforms: | 0 cfu/100 mL |
| Total chlorine: | 0 mg/L |

2.2 Equipment
2.2.1 Design and Construction

The extraction vessel, holding tanks, transfer pipes and related equipment should be constructed of food-grade stainless steel.

2.2.2 Extraction Vessel

The maté extraction is carried out in a double-jacketed kettle at 2.1 $kg/cm^2$ heated with over-critical hot water. A circular agitator with a speed of 60 rpm is required to facilitate optimal contact of the maté plant material with the extraction liquid. The extraction vessel must be totally enclosed with a top loading port and a screened bottom discharge valve to facilitate drainage of the finished extract.

2.2.3 Heat Exchanger

A heat exchanger is required to cool the primary extract from 100° C. to 5° C. to 10° C. immediately following the end of the thermal extraction interval.

2.2.4 Rack and Cloth Pack Press

A rack and cloth pack press is required for pressure extraction of the maté mash following hydro-thermal extraction. The press must be capable of achieving and maintaining a peak pressure of 250 $kg/cm^2$. Accessories required for pressure extraction include HDPE frame separators, HDPE press frames, and synthetic press cloth with an opening size of 1 mm.

2.3 Extraction Procedure

The following steps must be followed in order to achieve an effective extraction and subsequent clarification reactions.

2.3.1 Hydro-Thermal Extraction

The extraction vessel is filled with the required amount of water which is heated to 100° C. At 100° C. with the agitator running, the maté leaf is added, followed by the maté extract. The extraction mix is maintained at 100° C. under agitation for 10 minutes. Once the required extraction interval is achieved, the agitator is stopped and the liquid fraction is drained off, cooled to 5° C. to 10° C., and strained through a 250 μm screen into a sterilized stainless steel holding tank.

2.3.2 Pressure Extraction of Solids

Immediately following the completion of the hydro-thermal extraction phase, the remaining solids are transferred from the extraction vessel to a rack and frame pack press. This must be completed as quickly as possible in order to maintain a minimum mash temperature of 30° C. The mash is pressed to a pressure of 250 kg/cm² which is held for 10 minutes, or until the flow of liquid stops. The collected liquid is passed through a 250 μm screen and is combined with the hydro-thermal extract. The combined liquids constitute the raw extract.

3.0 Clarification
3.1. Raw Materials
3.1.1 Gelatin

Dry, powdered gelatin is used as one of the ingredients of a synergistic two-part colloidal clarification process. The gelatin must be a specifically formulated, positively charged material specifically formulated for the reduction of polyphenols and tannins by acting in combination with a silica gel suspension. The Bloom Value of the gelatin must be in the range of 90-100.

Gelatin treatment is applied at 0.15% w/w of the total extract formula. The gelatin treatment is added prior to the silica treatment.

The gelatin is applied as a gelatin solution prepared as follows. Dry gelatin powder is blended with 5 parts cold potable water under constant agitation. The gelatin suspension is blended for a period of 20 minutes and is subsequently diluted with a further 4-5 parts of hot potable water to bring the solution to 40° C.-50° C. The finished gelatin solution should be used as soon as possible.

3.1.2 Silica

A specialized Silica suspension is used in combination with a matched gelatin to initiate floc formation. The silica suspension must consist of a 30% active, negatively charged, colloidal solution of highly purified silica.

Silica treatment is applied at 0.15% w/w of the total extract formula. The silica treatment is added immediately following gelatin treatment.

3.2. Clarification Process

The raw maté extract is treated with silica and gelatin to initiate floc formation. Floc formation and sedimentation is catalyzed through a post-seeding freeze treatment

3.2.1 Floc Seeding

The raw maté extract is treated as follows at a temperature range of 5° C. to 10° C.:
a) With the raw extract under gentle agitation, add the prepared gelatin solution and allow to mix for 2 to 3 minutes.
b) Under continued agitation, add the silica sol and continue agitation for 2 to 3 minutes. The raw maté extract is now seeded for floc formation.
c) Allow the treated extract to stand undisturbed at 5° C. (or between 3° C. to 6° C.) for 48 hours to allow for sedimentation of formed solids.

3.2.2 Cryoflocculation

In order to achieve full floc formation and sedimentation of solids, a freezing interval is required immediately following the initial floc seeding step. Once gelatin and silica solutions have been allowed to react for 48 hours, the treated raw maté extract must be separated from formed sediment and chilled to −18° C. for at least 24 hrs. The extract must be fully frozen to achieve the required effect.

Once full extract solidification has been achieved, the extract is allowed to thaw with no physical disturbance. Once the extract is fully thawed, the clarified supernatant liquid is siphoned off and strained through a 250 μm screen. This becomes the "clarified maté extract". The remaining sediment is referred to as "extract cake".

3.2.3 Extract Cake Wash

A significant quantity of natural maté caffeine remains bound in the extract cake. In order to re-capture this caffeine and other bound xanthines, the extract cake is washed with cold water as follows:

Combine 1 part extract cake with 5.5 parts cold potable water in a stainless steel mixing vessel. Agitate mixture for 30 minutes at 20° C. (60 rpm mixer speed). Add 15% w/w Diatomaceous Earth filter aid (water permeability $1.97 \times 10^{-12}$ m²) and filter through a DE filter press. Finished, filtered product is the "cake wash".

The cake wash is used as the aqueous ingredient in the maté base formula.

4.0 Maté Beverage Base Formulation

The maté beverage base formulation is the commercial maté preparation which will be commercially available for the production of a ready-to-drink, sparkling Yerba Maté beverage.

4.1 Formulation

The maté beverage base formulation consists of clarified maté extract, NOP organic cane sugar, organic aromatic caramel colour, water and citric acid. Key quality parameters are as follows:

| | |
|---|---|
| Degrees brix: | 65.0 |
| pH: | 2.6 |
| Acidity: | 1.4 g/100 g w/w as citric acid |

4.2 Preparation

The clarified maté extract is combined with the water component and is heated under agitation to 70° C. Cane sugar, citric acid and colour are added and mixed until all ingredients are completely in solution. The ingredients are added so that the maté beverage base formulation contains 20.03% clarified maté extract, 58.4% cane sugar, 3.56% colour, 16.76% water and 1.25% citric acid (to achieve a final acidity of 1.4 g/100 g w/w measured as citric acid). Verify degrees brix and fill finished syrup in suitable containers. Plastic lined drums, or plastic pails are suitable. Store at 5° C. if syrup is used within 7 days, otherwise store frozen. An alternative is aseptic packing in sterile bag-in box containers.

5.0 Quality Control and Standardization

The finished maté beverage base formulation must be analyzed for levels of naturally occurring caffeine, theobromine, theophylline and antioxidant capacity (ORAC). High Performance Liquid Chromatography (HPLC) is used for analysis of caffeine, theobromine, theophylline. A microplate fluorescence assay is used to determine the ORAC value (Oxygen Radical Absorbance Capacity). The maté beverage base is formulated to deliver 55 mg-65 mg of naturally occurring caffeine per 300 mL serving with an ORAC value of 6,000-7,000 μmol TE/L.

6.0 Preparation Method For Carbonated Maté Beverage

The 65 degrees brix maté beverage base formulation and filtered water (0.20 μm) are combined into a sterile stainless steel tank and are mechanically agitated to a uniform mix (single strength beverage mix). Degrees brix and acid parameters are measured and adjusted if required. The single strength mixture is then filtered through a diatomaceous earth filter followed by a 1.0 μm pad filter and a 0.45 μm membrane filter into a sterile stainless steel holding tank. The filtered mixture is carbonated to a level of 3.0 volumes with food-grade carbon dioxide and is filled into retail packaging (glass bottles).

While the present invention has been described with reference to what are presently considered to be the preferred examples, it is to be understood that the invention is not limited to the disclosed examples. To the contrary, the invention is intended to cover various modifications and equivalent arrangements included within the spirit and scope of the appended claims.

All publications, patents and patent applications are herein incorporated by reference in their entirety to the same extent as if each individual publication, patent or patent application was specifically and individually indicated to be incorporated by reference in its entirety.

We claim:

1. A process for preparing a clarified maté extract comprising the steps of:
    (a) providing plant material from a plant of the species *Ilex*;
    (b) producing a raw extract from the plant material which comprises caffeine, theobromine and theophylline;
    (c) adding gelatin to the raw extract;
    (d) adding silica to the gelatin containing extract of step (c) and allowing to settle;
    (e) freezing the silica and gelatin containing extract of step (d); and
    (f) thawing the silica and gelatin containing extract of step (e) and separating a clarified liquid supernatant from solids to obtain a clarified maté extract and an extract cake.

2. The process of claim 1 wherein the extract cake of step (f) is subjected to an additional step comprising the addition of an aqueous solution to the extract cake and separating aqueous phase from solids to obtain a maté cake wash.

3. The process of claim 1 wherein the plant material is from *Ilex paraguariensis*.

4. The process of claim 1 wherein the plant material comprises *Ilex paraguariensis* leaves and stems.

5. The process of claim 4 wherein the plant material comprises a mixture of 95% leaf and 5% stem.

6. The process of claim 1 wherein the plant material is toasted.

7. The process of claim 1 wherein the plant material further comprises a green maté extract concentrate.

8. The process of claim 7 wherein the green maté extract concentrate comprises 8.0% to 10.0% w/w caffeine, 0.7% to 1.0% w/w theobromine and 0% - 0.2% w/w theophylline.

9. The process of claim 8 wherein the green maté extract concentrate comprises 10.0% w/w caffeine, 1.0% w/w theobromine and 0.2% w/w theophylline.

10. The process of claim 1 wherein step (b) comprising extraction of the plant material in water that is heated to a temperature of 100° C.

11. The process of claim 1 wherein step (c) uses a 0.10% to 0.15% w/w gelatin solution.

12. The process of claim 11 wherein step (c) uses a 0.15% w/w gelatin solution.

13. The process of claim 1 wherein step (d) uses a 0.10% to 0.15% w/w silica suspension.

14. The process of claim 13 wherein step (d) uses a 0.15% w/w silica suspension.

15. The process of claim 1 wherein the gelatin used in step (c) is formulated to reduce polyphenol and tannins, is positively charged, and has a bloom value between 90-100.

16. The process of claim 1 wherein the silica used in step (d) consists of a 30% active, negatively charged, colloidal solution of highly purified silica.

17. The process of claim 1 wherein said gelatin interacts synergistically with said silica in step (d).

18. The process of claim 1, wherein the separation of step (f) is by siphoning.

19. The process of claim 18, wherein the siphoned extract is strained.

20. The process of claim 19, wherein the siphoned extract is strained through a 250 μm screen.

* * * * *